United States Patent
Pola et al.

(10) Patent No.: US 11,262,464 B2
(45) Date of Patent: Mar. 1, 2022

(54) ACTIVE NEUTRON SPECTROMETER

(71) Applicants: Politecnico di Milano, Milan (IT); Raylab S.r.l., Caravaggio (IT)

(72) Inventors: Andrea Pola, Romano Lombardia (IT); Stefano Pasquato, Verona (IT); Dario Rastelli, Bonemerse (IT)

(73) Assignees: POLITECNICO DI MILANO, Milan (IT); RAYLAB S.R.L., Caravaggio (IT)

( * ) Notice: Subject to any disclaimer, the term of this patent is extended or adjusted under 35 U.S.C. 154(b) by 0 days.

(21) Appl. No.: 16/970,658

(22) PCT Filed: Mar. 6, 2019

(86) PCT No.: PCT/EP2019/055507
§ 371 (c)(1),
(2) Date: Aug. 18, 2020

(87) PCT Pub. No.: WO2019/179764
PCT Pub. Date: Sep. 26, 2019

(65) Prior Publication Data
US 2020/0379134 A1    Dec. 3, 2020

(30) Foreign Application Priority Data

Mar. 22, 2018 (IT) .................... 102018000003885

(51) Int. Cl.
*G01T 3/02* (2006.01)
*G01T 3/00* (2006.01)

(52) U.S. Cl.
CPC ............. *G01T 3/001* (2013.01); *G01T 3/02* (2013.01)

(58) Field of Classification Search
None
See application file for complete search history.

(56) References Cited

U.S. PATENT DOCUMENTS

| 9,081,100 | B1 | 7/2015 | Bellinger et al. |
| 2009/0039279 | A1 | 2/2009 | Fehrenbacher et al. |
| 2011/0049380 | A1* | 3/2011 | Dubeau .................... G01T 3/00 250/390.07 |

FOREIGN PATENT DOCUMENTS

DE     102014210944 A1    12/2015

OTHER PUBLICATIONS

International Search Report & Written Opinion in PCT/EP2019/055507 dated Jun. 28, 2019.

(Continued)

*Primary Examiner* — David P Porta
*Assistant Examiner* — Fani Boosalis
(74) *Attorney, Agent, or Firm* — Manelli Selter PLLC; Edward Stemberger (57) ABSTRACT

The active neutron spectrometer (1) comprises a polyhedral moderator body (2) of hydrogenated material having a first, a second and a third orthogonal main axis ($X_1$, $X_2$; $Y_1$, $Y_2$; $Z_1$, $Z_2$), a first series of thermal neutron detectors ($3_{a1}$, $3_{a2}$, $3_{a3}$, $3_{a4}$, $3_{a5}$, $3_{a6}$, $3_{b1}$, $3_{b2}$, $3_{b3}$, $3_{b4}$, $3_{b5}$, $3_{b6}$) arranged along the first main axis ($X_1$, $X_2$), a second series of thermal neutron detectors ($4_{a1}$, $4_{a2}$, $4_{a3}$, $4_{a4}$, $4_{a5}$, $4_{a6}$, $4_{b1}$, $4_{b2}$, $4_{b3}$, $4_{b4}$, $4_{b5}$, $4_{b6}$) arranged along the second main axis ($Y_1$, $Y_2$), and a third series of thermal neutron detectors ($5_{a1}$, $5_{a2}$, $5_{a3}$, $5_{a4}$, $5_{a5}$, $5_{a6}$, $5_{b1}$, $5_{b2}$, $5_{b3}$, $5_{b4}$, $5_{b5}$, $5_{b6}$) arranged along the third main axis ($Z_1$, $Z_2$).

12 Claims, 5 Drawing Sheets

(56) References Cited

OTHER PUBLICATIONS

Bedgni et al., Neutron spectrometry from thermal energies to GeV with single-moderator instruments:, The European Physical Journal Plus, Springer Berlin Heidelberg, Berlin/Heidelberg, vol. 130, No. 2, pp. 1-4, Feb. 10, 2015.

* cited by examiner

ACTIVE NEUTRON SPECTROMETER

The present invention relates to an active neutron spectrometer, that is, an instrument based on active detectors for measuring the energy spectrum of neutron fields ranging from thermal energies (less than 1 eV) to high energies (greater than 100 MeV).

The instruments typically used in the sector of neutron dosimetry, called neutron monitors, are capable of providing a measurement of a single quantity for radiation protection purposes, called ambient dose equivalent H*(10). This parameter is given by the mathematical integration of the energy spectrum of the incident field multiplied by suitable conversion coefficients which are in turn dependent on the energy. Not being able to provide spectral information, neutron monitors are designed to approximate, with their energy response, the trend in said conversion coefficients and provide a weighted average estimate of H*(10). However, this estimate does not provide any indications on the spectrometric characteristics of the neutron field in question or the sources which generated it. Furthermore, the entity of the approximation implemented is strongly dependent on the energy of the incident field itself.

A spectrometer, by contrast, is able to measure the entire energy distribution of the neutron field and thus characterise, in the most detailed and useful manner possible, the neutron field present in the measuring point.

Measuring the spectrum makes it possible to identify the type of field and source in question and provides a more rigorous estimate of H*(10). Furthermore, it offers the possibility of deriving other possible radiation protection parameters of interest and quantifying the relative contribution of the various field components.

This proves to be of great operational utility in all contexts in which there are control, verification and field monitoring needs, such as in the nuclear industry, hospitals in which radiotherapy is performed, oncological hadrontherapy centres, research centres and inspection bodies or institutions.

The systems presently used for the measurement of neutron fields, in particular Bonner spheres, consist of a set of detectors (generally from 6 to 12) which allow the field spectrum and the operating parameters of interest to be measured only downstream of multiple exposures for each measuring point.

This implies the need for long setup and exposure times, a high rate of intervention of technical personnel during the measurements and the impossibility of carrying out continuous real-time monitoring.

Furthermore, these systems exploit a single neutron sensor which, despite being very sensitive, requires high voltage polarisations and sometimes poses major problems tied to the availability and cost of the gas contained in them (Helium-3).

There is also a known neutron spectrometer consisting of a single spherical moderator made of hydrogenated material, typically polyethylene, in which 31 thermal neutron detectors produced by depositing a thin layer of Lithium-6 Fluoride on commercial semiconductor detectors are distributed at different depths along the three Cartesian axes.

Placed inside the moderating structure there is a spherical shell made of lead designed to ensure a good response of the system to neutrons with an energy higher than 20 MeV, and which, in turn, encloses the last thermal neutron sensor.

This instrument shows major limits of application that render it not "portable" in a strict sense, in particular in terms of overall dimensions (sphere with a diameter of 25-30 cm) and weight (over 10 kg). Furthermore, the spherical geometry adopted, in particular the presence of the internal spherical lead shell, entails a great complexity of construction.

The technical task of the present invention is therefore to provide an active neutron spectrometer that enables the limitations of the prior art to be transcended.

Within the scope of this technical task, one object of the invention is to provide an active neutron spectrometer capable of measuring the energy spectrum of the field and the operating parameters of interest downstream of a single exposure for each measuring point.

Another object of the invention is to provide an active neutron spectrometer capable of performing continuous real-time monitoring.

Another object of the invention is to provide an active neutron spectrometer capable of obtaining an isotropic response and an optimised sensitivity across the whole energy spectrum of interest.

Another object of the invention is to provide an active neutron spectrometer that can be produced with readily available low-cost materials.

Yet a further object of the invention is to provide an active neutron spectrometer that is lightweight and in particular portable.

The technical task, as well as these and other objects, are achieved, according to the present invention, by providing an active neutron spectrometer characterised in that it comprises a polyhedral moderator body of hydrogenated material having a centre and an external surface comprising flat faces and vertices which in pairs delimit a first, a second and a third orthogonal main axis of the polyhedral moderator body, a first series of thermal neutron detectors housed in channels which are arranged along said first main axis and which open onto one of said pairs of vertices, a second series of thermal neutron detectors housed in channels which are arranged along said second main axis and which open onto one of said pairs of vertices, and a third series of thermal neutron detectors housed in channels which are arranged along said third main axis and which open onto one of said pairs of vertices, said polyhedral moderator body further having channels which extend in the direction that goes from said centre to the centre of said flat faces and which open onto said flat faces for the possible housing of inserts of a high atomic number.

The active neutron spectrometer according to the invention can have application in radiological monitoring, radiation protection in nuclear plants, in nuclear material storage sites, in hospital radiotherapy and/or hadrontherapy centres, research centres, and inspection bodies or institutions.

The spectrometer preferably comprises inserts of a high atomic number material, housed in said moderator body.

Said inserts of a high atomic number material are preferably positioned on the external surface of said moderator body.

The thermal neutron detectors of each series are preferably distributed symmetrically with respect to the centre of the moderator body.

The thermal neutron detectors of each series are preferably distributed at progressively decreasing distances from the centre toward the external surface of the moderator body.

Said first, second and third series of thermal neutron detectors preferably have like detectors arranged at a same distance from the centre of the moderator.

Said moderator body is preferably octahedral.

Said thermal neutron detectors are preferably positioned in groups in inserts of hydrogenated material housed in said channels.

Said inserts of a high atomic number material are preferably positioned at the centre of the flat faces of said polyhedral moderator body.

Said moderator body is preferably made of polyethylene.

Said inserts of a high atomic number material are preferably made of lead.

Said moderator body is preferably clad by an electromagnetic shield.

The present invention further discloses a method of processing the response of the active neutron spectrometer, characterised by: deriving the energy spectrum of the neutron field by processing the sum of the readings of all the thermal neutron detectors located at a same distance from the centre of the moderator body; and estimating the distribution of the directions of incidence of the neutron field by means of a weighted sum of the readings of all the thermal neutron detectors positioned along the same semi-axis of all the main axes.

The geometric configuration of the moderator body was chosen based on an analysis of the relation between the distribution of moderating material and the internal distribution of the thermal neutron detectors.

It has been discovered that, surprisingly, a polyhedral geometry of the moderator body enables the performance of the system to be improved from both a physical and operational point of view. In fact, the new polyhedral geometry of the moderator body makes it possible to: greatly reduce the total weight of the spectrometer, thus making it not only transportable, but also portable; improve the isotropy of the response, in terms of both average uniformity and maximum deviation; improve the sensitivity in the regions of the energy spectrum in the neighbourhood of MeV, useful from an operational point of view; simplify the mechanical construction and reduce production costs.

The other advantageous aspect of the invention derives from the modified distribution of the high atomic number material. In fact, the literature presents solely and exclusively the use of spherical shells placed inside the moderating structure with the aim of obtaining a good isotropic response at neutron energies greater than 20 MeV. The production of these shells and the necessity of producing moderating structures capable of housing them greatly complicates the design and production of the instrument. According to the present invention, by contrast, there are provided surface inserts made of a high atomic number material which extend to an appropriate depth and are distributed according to different directions so as to ensure an adequate response for energies exceeding 20 MeV, while maintaining the isotropy of the system's response. Such an arrangement of the inserts of a high atomic number material also makes it possible to greatly simplify the distribution of the thermal neutron detectors since the necessity, and hence the associated mechanical complexity, of inserting one or more thermal neutron detectors inside a shell no longer exists.

Moreover, the moderator body can be configured to receive inserts of high atomic number material, but these need not be mounted in the moderator body for applications in which only low energy neutron fields are envisaged, and in such a case the inserts of a high atomic number material can be replaced by inserts of hydrogenated material.

The inserts of a high atomic number material can also be mounted later thanks to their surface positioning on the moderator body. Additional features and advantages of the invention will become more apparent from the description of a preferred but non-exclusive embodiment of the active neutron spectrometer according to the invention, illustrated by way of non-limiting example in the appended drawings, in which:

With reference to the above-mentioned figures, they show an active neutron spectrometer denoted in its entirety by the reference number 1.

The spectrometer 1 comprises a polyhedral moderator body 2, preferably octahedral, as illustrated, of hydrogenated material, and a plurality of thermal neutron detectors $3_{a1}, 3_{a2}, 3_{a3}, 3_{a4}, 3_{a5}, 3_{a6}, 3_{b1}, 3_{b2}, 3_{b3}, 3_{b4}, 3_{b5}, 3_{b6}, 4_{a1}, 4_{a2}, 4_{a3}, 4_{a4}, 4_{a5}, 4_{a6}, 4_{b1}, 4_{b2}, 4_{b3}, 4_{b4}, 4_{b5}, 4_{b6}, 5_{a1}, 5_{a2}, 5_{a3}, 5_{a4}, 5_{a5}, 5_{a6}, 5_{b1}, 5_{b2}, 5_{b3}, 5_{b4}, 5_{b5}, 5_{b6}$.

The thermal neutron detectors are preferably made up of semiconductor sensors of a known type in contact with planar converters of thermal neutrons (not shown) preferably containing the isotopes Borum-10 and/or Lithium-6 according to the known literature.

The moderator body 2 is preferably made of polyethylene.

Figure 2:
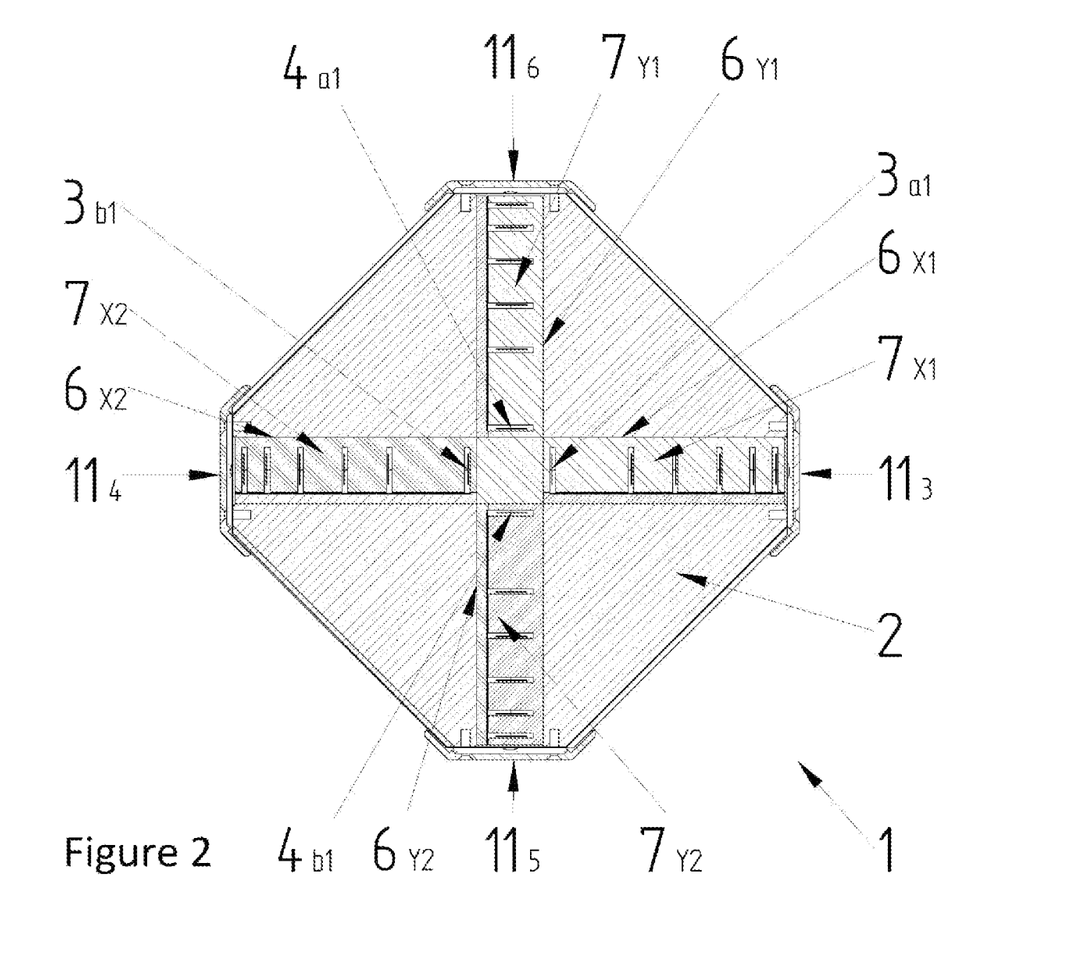
FIG. 2 shows a sectional view of the spectrometer along the plane containing two of the three orthogonal main axes of the moderator body.
Figure 3:
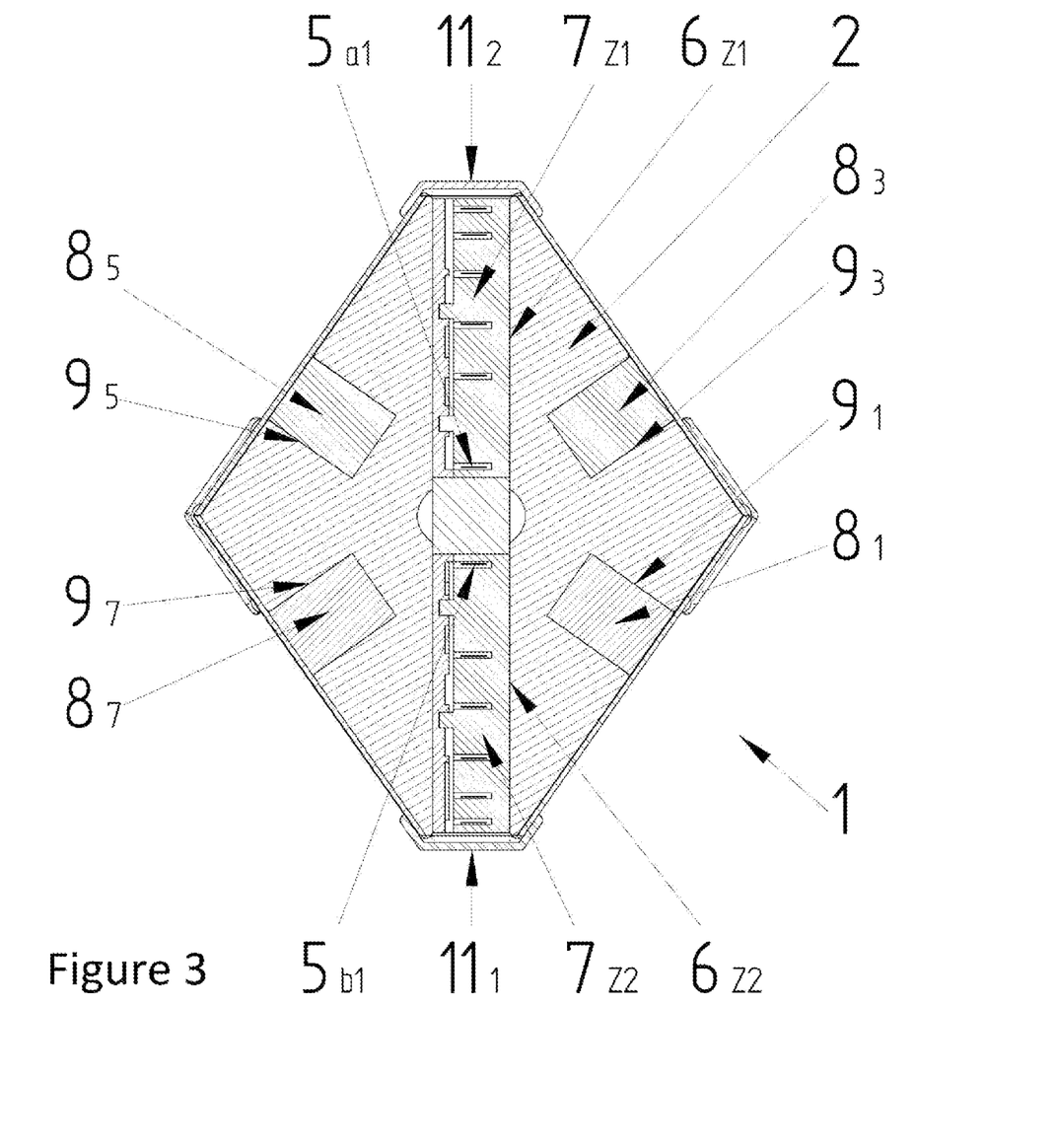
FIG. 3 shows a sectional view of the spectrometer along the plane containing the third main axis of the moderator body orthogonal to the two main axes illustrated in FIG. 2.

The polyhedral moderator body 2 has a centre O and a first main axis $X_1, X_2$, a second main axis $Y_1, Y_2$ and a third main axis $Z_1, Z_2$ orthogonal to one another.

Figure 4:
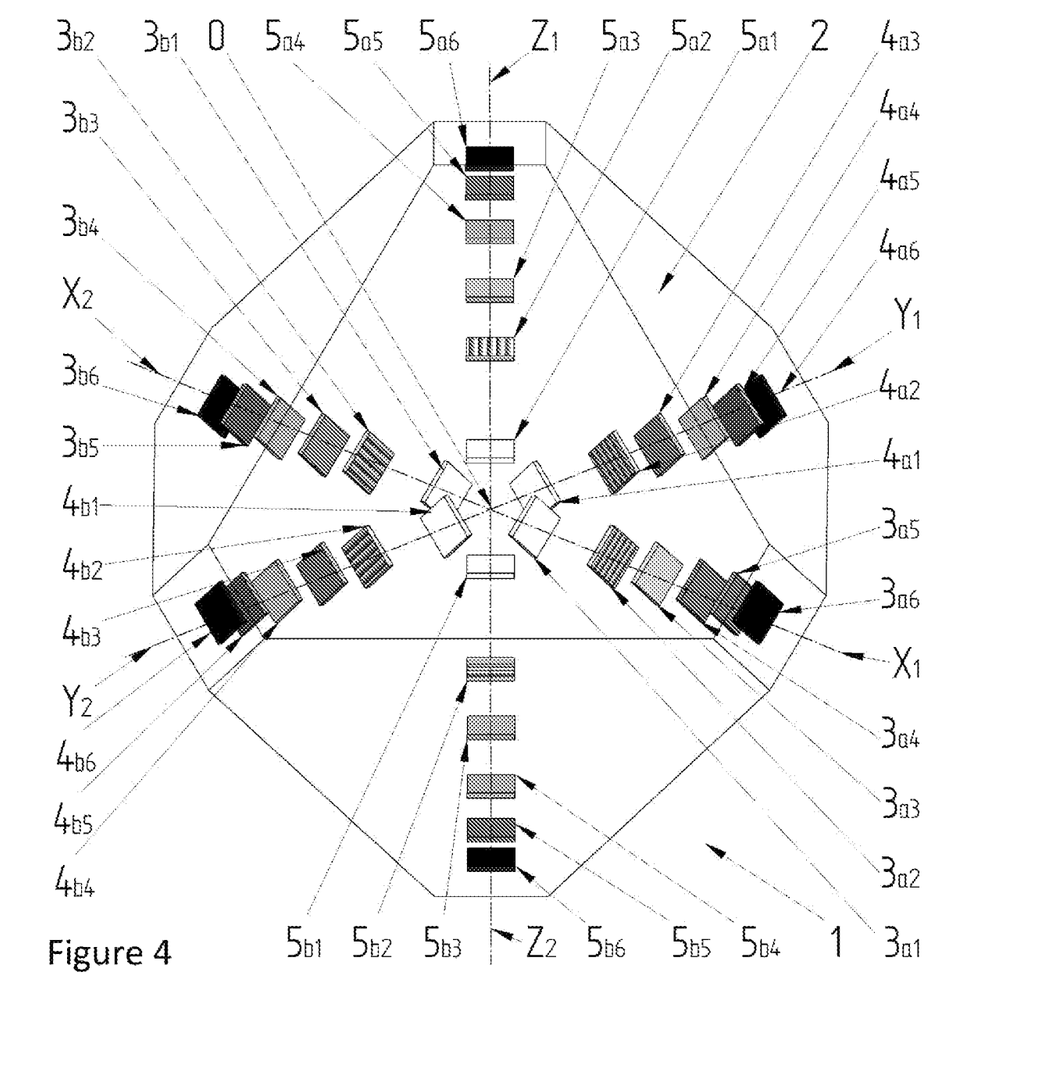
FIG. 4 shows the layout of the detectors in the spectrometer.

A first series of thermal neutron detectors $3_{a1}, 3_{a2}, 3_{a3}, 3_{a4}, 3_{a5}, 3_{a6}, 3_{b1}, 3_{b2}, 3_{b3}, 3_{b4}, 3_{b5}, 3_{b6}$, is arranged along the first main axis $X_1, X_2$.

The thermal neutron detectors of the first series are distributed symmetrically with respect to the centre O of the moderator body 2; consequently, a first group of detectors $3_{a1}, 3_{a2}, 3_{a3}, 3_{a4}, 3_{a5}, 3_{a6}$, is distributed along a semi-axis $X_1$ of the axis $X_1, X_2$, and a second group of detectors $3_{b1}, 3_{b2}, 3_{b3}, 3_{b4}, 3_{b5}, 3_{b6}$ is distributed along the other semi-axis $X_2$ of the axis $X_1, X_2$.

The like detectors on the two semi-axes $X_1, X_2$, are therefore at the same distance from the centre O of the moderator body 2, thus the detectors $3_{a1}$ and $3_{b1}$, the detectors $3_{a2}$ and $3_{b2}$, the detectors $3_{a3}$ and $3_{b3}$, the detectors $3_{a4}$ and $3_{b4}$, the detectors $3_{a5}$ and $3_{b5}$, and the detectors $3_{a6}$ and $3_{b6}$.

The thermal neutron detectors of the first series are distributed at progressively decreasing distances from the centre O towards the external surface of the moderator body 2; thus along the semi-axis $X_1$, the distance between the detectors $3_{a1}$ and $3_{a2}$ is no less than the distance between the detectors $3_{a2}, 3_{a3}$, the distance between the detectors $3_{a2}, 3_{a3}$ is no less than the distance between the detectors $3_{a3}, 3_{a4}$, and so forth. The same applies for the detectors positioned along the semi-axis $X_2$.

A second series of thermal neutron detectors $4_{a1}, 4_{a2}, 4_{a3}, 4_{a4}, 4_{a5}, 4_{a6}, 4_{b1}, 4_{b2}, 4_{b3}, 4_{b4}, 4_{b5}, 4_{b6}$, is arranged along the second main axis $Y_1, Y_2$.

The thermal neutron detectors of the second series are distributed symmetrically with respect to the centre O of the moderator body 2; consequently, a first group of detectors $4_{a1}, 4_{a2}, 4_{a3}, 4_{a4}, 4_{a5}, 4_{a6}$, is distributed along a semi-axis $Y_1$ of the axis $Y_1$, $Y_2$, and a second group of detectors $4_{b1}$, $4_{b2}$, $4_{b3}$, $4_{b4}$, $4_{b5}$, $4_{b6}$ is distributed along the other semi-axis $Y_2$ of the axis $Y_1$, $Y_2$.

The like detectors on the two semi-axes $Y_1$, $Y_2$, are therefore at the same distance from the centre O of the moderator body 2, thus the detectors $4_{a1}$ and $4_{b1}$, the detectors $4_{a2}$ and $4_{b2}$, the detectors $4_{a3}$ and $4_{b3}$, the detectors $4_{a4}$ and $4_{b4}$, the detectors $4_{a5}$ and $4_{b5}$, and the detectors $4_{a6}$ and $4_{b6}$.

The thermal neutron detectors of the second series are distributed at progressively decreasing distances from the centre O towards the external surface of the moderator body 2; thus along the semi-axis $Y_1$, the distance between the detectors $4_{a1}$ and $4_{a2}$ is no less than the distance between the detectors $4_{a2}$, $4_{a3}$, the distance between the detectors $4_{a2}$, $4_{a3}$ is no less than the distance between the detectors $4_{a3}$, $4_{a4}$, and so forth. The same applies for the detectors positioned along the semi-axis $Y_2$.

A third series of thermal neutron detectors $5_{a1}$, $5_{a2}$, $5_{a3}$, $5_{a4}$, $5_{a5}$, $5_{a6}$, $5_{b1}$, $5_{b2}$, $5_{b3}$, $5_{b4}$, $5_{b5}$, $5_{b6}$ is arranged along the third main axis $Z_1$, $Z_2$.

The thermal neutron detectors of the third series are distributed symmetrically with respect to the centre O of the moderator body 2; consequently, a first group of detectors $5_{a1}$, $5_{a2}$, $5_{a3}$, $5_{a4}$, $5_{a5}$, $5_{a6}$, is distributed along a semi-axis $Z_1$ of the axis $Z_1$, $Z_2$, and a second group of detectors $5_{b1}$, $5_{b2}$, $5_{b3}$, $5_{b4}$, $5_{b5}$, $5_{b6}$ is distributed along the other semi-axis $Z_2$ of the axis $Z_1$, $Z_2$.

The like detectors on the two semi-axes $Z_1$, $Z_2$, are therefore at the same distance from the centre O of the moderator body 2, thus the detectors $5_{a1}$ and $5_{b1}$, the detectors $5_{a2}$ and $5_{b2}$, the detectors $5_{a3}$ and $5_{b3}$, the detectors $5_{a4}$ and $5_{b4}$, the detectors $5_{a5}$ and $5_{b5}$, and the detectors $5_{a6}$ and $5_{b6}$.

The thermal neutron detectors of the third series are distributed at progressively decreasing distances from the centre O towards the external surface of the moderator body 2, thus along the semi-axis $Z_1$, the distance between the detectors $5_{a1}$ and $5_{a2}$ is no less than the distance between the detectors $5_{a2}$, $5_{a3}$, the distance between the detectors $5_{a2}$, $5_{a3}$ is no less than the distance between the detectors $5_{a3}$, $5_{a4}$, and so forth. The same applies for the detectors positioned along the semi-axis $Z_2$.

The first, second and third series of thermal neutron detectors have like detectors arranged at the same distance from the centre O of the moderator body 2.

Thus, for example, the detectors $3_{a1}$, $3_{b1}$, $4_{a1}$, $4_{b1}$, $5_{a1}$, $5_{b1}$ are arranged at the same distance from the centre O of the moderator body 2, as are the detectors $3_{a2}$, $3_{b2}$, $4_{a2}$, $4_{b2}$, $5_{a2}$, $5_{b2}$, the detectors $3_{a3}$, $3_{b3}$, $4_{a3}$, $4_{b3}$, $5_{a3}$, $5_{b3}$, the detectors $3_{a4}$, $3_{b4}$, $4_{a4}$, $4_{b4}$, $5_{a4}$, $5_{b4}$, the detectors $3_{a5}$, $3_{b5}$, $4_{a5}$, $4_{b5}$, $5_{a5}$, $5_{b5}$ and the detectors $3_{a6}$, $3_{b6}$, $4_{a6}$, $4_{b6}$, $5_{a6}$, $5_{b6}$.

Figure 1:
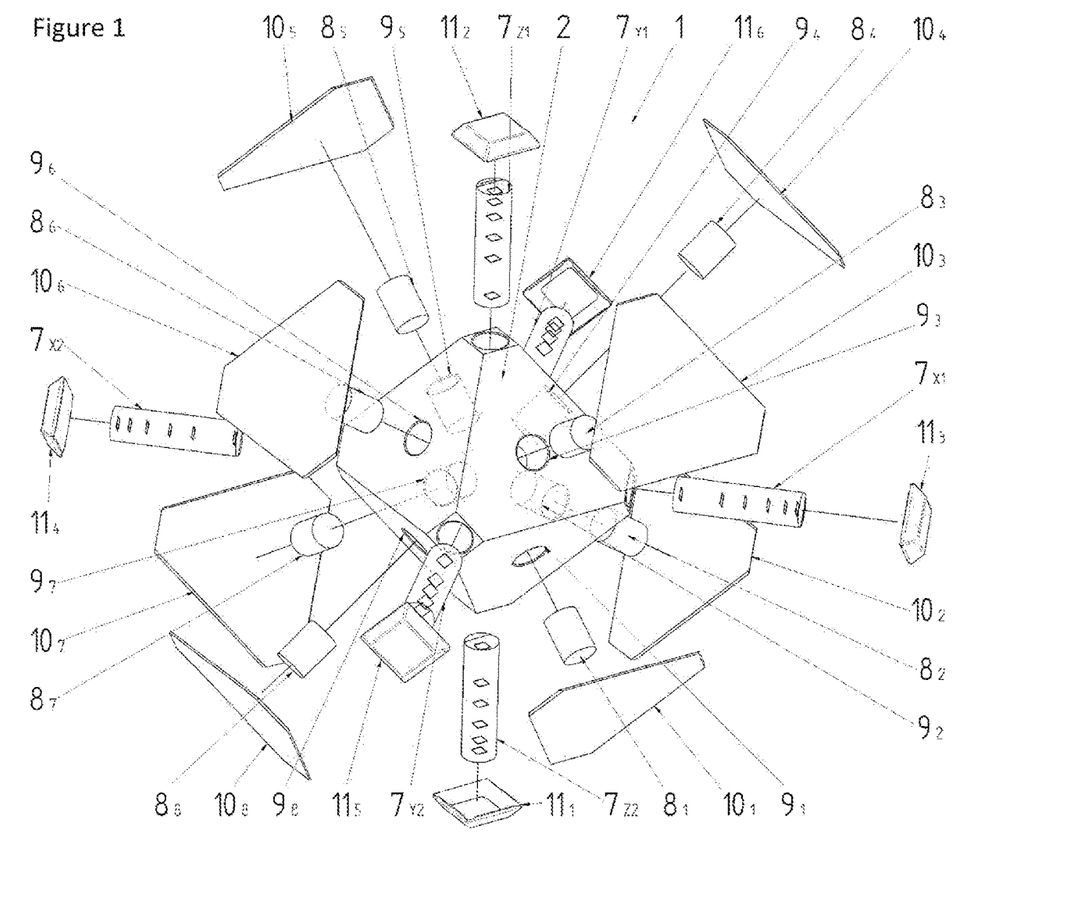
FIG. 1 shows an exploded view of the spectrometer.

The moderator body 2 comprises channels $6_{x1}$, $6_{x2}$, $6_{y1}$, $6_{y2}$, $6_{z1}$, $6_{z2}$ which extend along the main axes $X_1$, $X_2$ $Y_1$, $Y_2$ $Z_1$, $Z_2$ and open onto the external surface thereof so as to house the thermal neutron detectors.

The thermal neutron detectors are positioned in groups in inserts $7_{x1}$, $7_{x2}$, $7_{y1}$, $7_{y2}$, $7_{z1}$, $7_{z2}$ of hydrogenated material housed in the channels $6_{x1}$, $6_{x2}$, $6_{y1}$, $6_{y2}$, $6_{z1}$, $6_{z2}$.

The inserts $7_{x1}$, $7_{x2}$, $7_{y1}$, $7_{y2}$, $7_{z1}$, $7_{z2}$ of hydrogenated material are also preferably made of polyethylene.

Furthermore, the inserts $7_{x1}$, $7_{x2}$, $7_{y1}$, $7_{y2}$, $7_{z1}$, $7_{z2}$ of hydrogenated material are preferably cylindrical in shape and the channels $6_{x1}$, $6_{x2}$, $6_{y1}$, $6_{y2}$, $6_{z1}$, $6_{z2}$ housing them have a mating shape.

The construction of the spectrometer 1 is therefore such as to enable the channels $6_{x1}$, $6_{x2}$, $6_{y1}$, $6_{y2}$, $6_{z1}$, $6_{z2}$ to be easily accessed in order to introduce and extract the inserts $7_{x1}$, $7_{x2}$, $7_{y1}$, $7_{y2}$, $7_{z1}$, $7_{z2}$ into/from the moderator body 2 during inspection and/or maintenance phases.

A housing (not shown) for electronics for the management and control of the thermal neutron detectors is provided inside the inserts $7_{x1}$, $7_{x2}$, $7_{y1}$, $7_{y2}$, $7_{z1}$, $7_{z2}$.

The inserts $8_1$, $8_2$, $8_3$, $8_4$, $8_5$, $8_6$, $8_7$, $8_8$ of a high atomic number material, preferably made of lead, alternatively of copper, tungsten, etc., are housed in the moderator body 2.

The inserts $8_1$, $8_2$, $8_3$, $8_4$, $8_5$, $8_6$, $8_7$, $8_8$ of a high atomic number preferably have a cylindrical shape.

The inserts $8_1$, $8_2$, $8_3$, $8_4$, $8_5$, $8_6$, $8_7$, $8_8$ of a high atomic number material are positioned on the external surface of the moderator body 2, in particular each at the centre of a corresponding flat face of the moderator body 2.

The moderator body 2 comprises channels $9_1$, $9_2$, $9_3$, $9_4$, $9_5$, $9_6$, $9_7$, $9_8$ of a shape mating that of the inserts $8_1$, $8_2$, $8_3$, $8_4$, $8_5$, $8_6$, $8_7$, $8_8$ of a high atomic number, which extend in the direction that goes from the centre O to the centre of the flat faces thereof and open onto the flat faces thereof so as to house the inserts $8_1$, $8_2$, $8_3$, $8_4$, $8_5$, $8_6$, $8_7$, $8_8$ of a high atomic number.

The construction of the spectrometer 1 is therefore such as to enable the channels $9_1$, $9_2$, $9_3$, $9_4$, $9_5$, $9_6$, $9_7$, $9_8$ to be easily accessed in order to introduce, as needed, the inserts $8_1$, $8_2$, $8_3$, $8_4$, $8_5$, $8_6$, $8_7$, $8_8$ of a high atomic number into the moderator body 2 for the measurement of high energy neutron spectra.

The use of the surface inserts $8_1$, $8_2$, $8_3$, $8_4$, $8_5$, $8_6$, $8_7$, $8_8$ of a high atomic number ensures isotropy and improves the system's response to energies greater than 20 MeV by means of a simple, easy-to-produce structure.

Furthermore, the response of the spectrometer 1 to high energies can be changed simply by changing the material forming the inserts $8_1$, $8_2$, $8_3$, $8_4$, $8_5$, $8_6$, $8_7$, $8_8$ of a high atomic number.

The moderator body 2 is clad by an electromagnetic shield which shields the thermal neutron detectors against external electromagnetic fields.

The electromagnetic shield is formed by metal plates $10_1$, $10_2$, $10_3$, $10_4$, $10_5$, $10_6$, $10_7$, $10_8$ applied so as to cover the flat faces of the moderator body 2.

At the vertices of the moderator body 2, by contrast, caps $11_1$, $11_2$, $11_3$, $11_4$, $11_5$, $11_6$ are applied to close off the channels $6_{x1}$, $6_{x2}$, $6_{y1}$, $6_{y2}$, $6_{z1}$, $6_{z2}$ housing the thermal neutron detectors.

The plates $10_1$, $10_2$, $10_3$, $10_4$, $10_5$, $10_6$, $10_7$, $10_8$ and the caps $11_1$, $11_2$, $11_3$, $11_4$, $11_5$, $11_6$ are preferably made of aluminium.

On the outside of the spectrometer 1 there is also provided a housing (not shown) for electronics for the management and control of the system and a housing (not shown) for a power supply unit for supplying the electricity necessary for the operation of the spectrometer 1.

The active spectrometer 1 illustrated envisages, in detail, 36 thermal neutron detectors positioned, for each semi-axis of the moderator body 2, at the following radial depths: 19, 55, 75, 95, 110 and 120 mm. This arrangement, which is modifiable within certain limits, makes it possible to obtain an adequate dependency of the response of the thermal neutron detectors on the energy of the incident neutrons (where adequate means such as to ensure a gradual, but substantial diversification of the energy responses).

As it is possible to observe, the distribution of the thermal neutron detectors is reproduced in an analogous fashion along the 6 semi-axes of the moderator body 2.

The readings of the thermal neutron detectors are processed in two distinct ways:

a) by summing the readings of the thermal neutron detectors located at the same radial distance from the centre of the moderator body 2, thus defining the 6 groups of detectors that contribute to the 6 energy response functions of the system; this radial sum increases and ensures the isotropy of the system's overall response.

b) by appropriately summing the readings of the thermal neutron detectors located along the same semi-axis of the moderator body 2, so as to form 6 sets of detectors by means of which to evaluate the distribution of the directions of incidence of the beam.

The polyhedral geometry conceived and implemented thus makes it possible to optimise the isotropy of the response, increase the response of the detectors located at a depth and have an overall lightweight system.

The inserts with a high atomic number have the function of improving the system's response at energies greater than 20 MeV. Their placement is aimed at ensuring the isotropy of the response at high energies, whilst the dimensions, in particular the length, result from the optimisation of the response (adequate above 20 MeV, not attenuated below 20 MeV).

Figure 5:
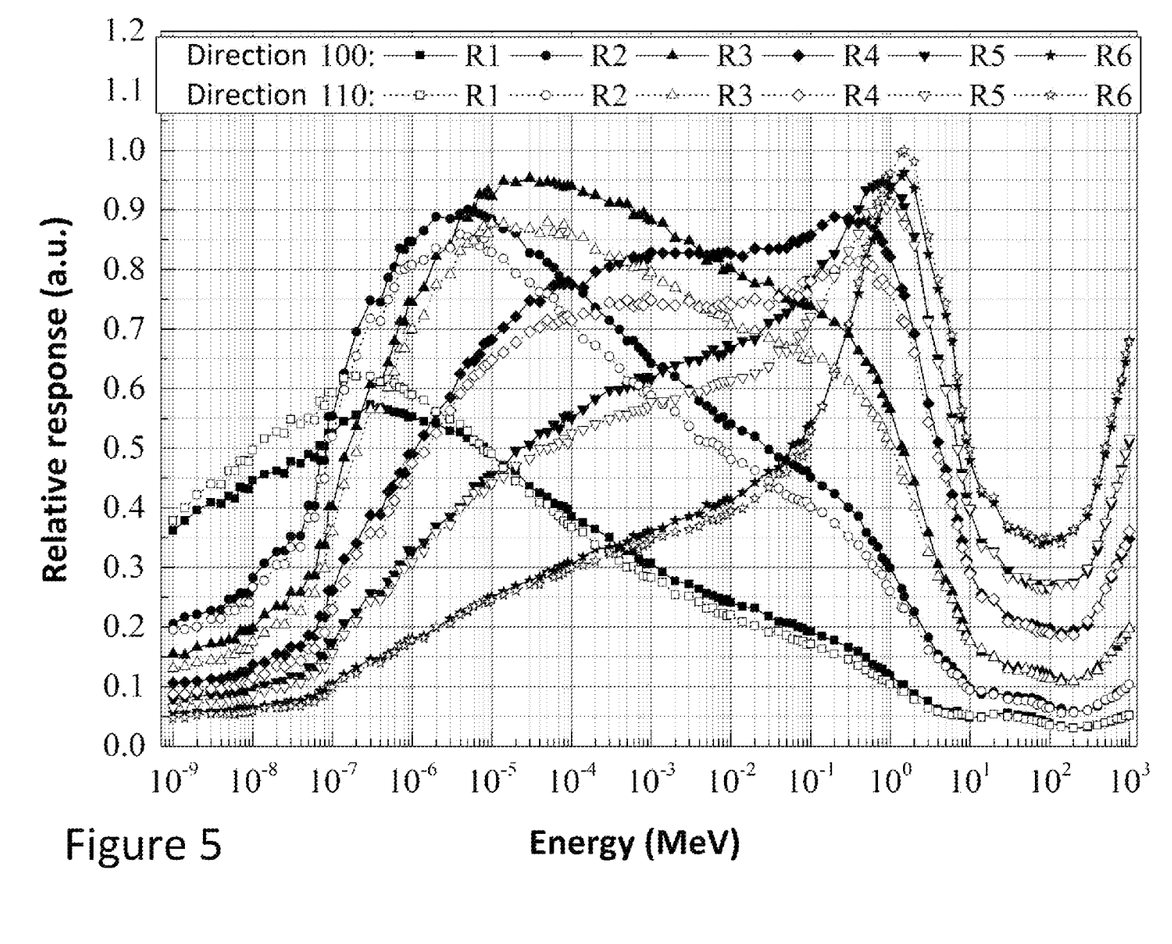
FIG. 5 shows the relative response of the spectrometer for neutron fields incident according to the two directions giving rise to the maximum deviation relative to the isotropic condition.

The 6 functions of response to the monoenergetic neutrons of the system calculated, obtained by summing the responses of the detectors as per step a), are shown in FIG. 5 in reference to neutron fields incident according to the two directions that give rise to the maximum deviation from the isotropic condition. From FIG. 5 it is possible to observe the isotropy of the system's response, as well as the modularity required for the reconstruction of the energy spectrum.

The reconstruction of the neutron spectrum is ultimately achieved by means of a software deconvolution algorithm which, by implementing the 6 response functions of the system, processes the readings of the 6 groups of detectors indicated in step a) in real time and extracts the spectrum of the incident field. A further software routine analyses the readings of the 6 groups of detectors indicated in step b) in order to reconstruct the distribution of the directions of origin of the field.

The polyhedral structure of the spectrometer 1 together with the isotropy of the response ensures that it will not need additional supports and can be easily rested on a surface and used according to various orientations, and its reduced weight enables it to be used as a portable instrument, like a simple monitor.

The invention provides an active neutron spectrometer having numerous advantages: the multiple detectors are distributed according to a configuration that may be easily implemented in a modular way; its weight allows for portability; measurement of the field can be performed with a single exposure; monitoring can be performed continuously over time, potentially also in points which are not served by the mains electricity supply by using, for example, a battery pack; the intervention of technical personnel during measurement is greatly reduced and also possible from a remote location; no post-processing of the data collected during measurements is necessary, as a deconvolution algorithm is implemented which processes the useful operating information (spectral and dosimetric characteristics) in real time.

The neutron spectrometer thus conceived is susceptible of numerous modifications and variants, all falling within the scope of the inventive concept; furthermore, all the details can be replaced by technically equivalent elements.

The materials used, as well as the dimensions, may in practice be any whatsoever, according to needs and the state of the art.

The invention claimed is:

1. An active neutron spectrometer comprising:
a polyhedral moderator body of hydrogenated material having a centre and an external surface comprising flat faces and vertices which in pairs delimit a first, a second and a third orthogonal main axis ($X_1$, $X_2$; $Y_1$, $Y_2$; $Z_1$, $Z_2$) of the polyhedral moderator body,
a first series of thermal neutron detectors housed in first channels which are arranged along said first main axis ($X_1$, $X_2$) and which open onto one of said pairs of vertices,
a second series of thermal neutron detectors housed in second channels which are arranged along said second main axis ($Y_1$, $Y_2$) and which open onto one of said pairs of vertices, and
a third series of thermal neutron detectors housed in third channels which are arranged along said third main axis ($Z_1$, $Z_2$) and which open onto one of said pairs of vertices,
said polyhedral moderator body further having fourth channels which extend in the direction that goes from said centre to the centre of said flat faces and which open onto said flat faces and being constructed and arranged to house inserts of a high atomic number.

2. The active neutron spectrometer according to claim 1 wherein said inserts of a high atomic number material are positioned on an external surface of said moderator body.

3. The active neutron spectrometer according to claim 1 wherein said thermal neutron detectors of each series are distributed symmetrically with respect to the centre of the moderator body.

4. The active neutron spectrometer according to claim 1 wherein said thermal neutron detectors of each series are distributed at progressively decreasing distances from the centre towards the external surface of the moderator body.

5. The active neutron spectrometer according to claim 1 wherein said first, second and third series of thermal neutron detectors have like detectors arranged at a same distance from the centre of the moderator body.

6. The active neutron spectrometer according to claim 1 wherein said moderator body is octahedral.

7. The active neutron spectrometer according to claim 6 wherein said thermal neutron detectors are positioned in groups in second inserts, said second inserts being of hydrogenated material housed in said first, second and third channels.

8. The active neutron spectrometer according to claim 1 wherein said inserts of a high atomic number material are positioned at the centre of the flat faces of said moderator body.

9. The active neutron spectrometer according to claim 1 wherein said moderator body is made of polyethylene.

10. The active neutron spectrometer according to claim 1 wherein said inserts of a high atomic number material are made of lead.

11. The active neutron spectrometer according to claim 1 wherein said moderator body is clad by an electromagnetic shield.

12. A method of processing a response of an active neutron spectrometer comprising:
providing the active neutron spectrometer that comprises:
a polyhedral moderator body of hydrogenated material having a centre and an external surface comprising flat faces and vertices which in pairs delimit a first, a second and a third orthogonal main axis ($X_1$, $X_2$; $Y_1$, $Y_2$; $Z_1$, $Z_2$) of the polyhedral moderator body, a first series of thermal neutron detectors housed in first channels which are arranged along said first main axis ($X_1$, $X_2$) and which open onto one of said pairs of vertices, a second series of thermal neutron detectors housed in second channels which are arranged along said second main axis ($Y_1$, $Y_2$) and which open onto one of said pairs of vertices, and a third series of thermal neutron detectors housed in third channels which are arranged along said third main axis ($Z_1$, $Z_2$) and which open onto one of said pairs of vertices, said polyhedral moderator body further having fourth channels which extend in the direction that goes from said centre to the centre of said flat faces and which open onto said flat faces and being constructed and arranged to house inserts of a high atomic number;

supplying an energy spectrum of the neutron field and useful radiation protection magnitudes by processing a sum of readings of all the thermal neutron detectors located at a same distance from the centre of said moderator body; and evaluating a distribution of directions of incidence of the neutron beam by appropriately summing readings of all the thermal neutron detectors positioned along the same semi-axis of all said main axes ($X_1$, $X_2$; $Y_1$, $Y_2$; $Z_1$, $Z_2$).

* * * * *